United States Patent [19]

Kavaler

[11] Patent Number: 5,210,825

[45] Date of Patent: May 11, 1993

[54] METHOD AND AN APPARATUS FOR DISPLAYING GRAPHICAL DATA RECEIVED FROM A REMOTE COMPUTER BY A LOCAL COMPUTER

[75] Inventor: Robert Kavaler, Berkeley, Calif.

[73] Assignee: Teknekron Communications Systems, Inc., Berkeley, Calif.

[21] Appl. No.: 514,590

[22] Filed: Apr. 26, 1990

[51] Int. Cl.⁵ ............................................. G06F 15/62
[52] U.S. Cl. ........................... 395/147; 364/DIG. 2; 364/920.7; 364/927.2; 364/944.5
[58] Field of Search ............... 364/519, 520, 521, 200, 364/518; 395/145, 147, 275, 200

[56] References Cited

U.S. PATENT DOCUMENTS

| | | | |
|---|---|---|---|
| 3,624,632 | 11/1971 | Ophir | 340/324 A |
| 3,967,268 | 6/1976 | Roberts | 340/324 |
| 4,075,620 | 2/1978 | Passavant et al. | 340/324 AD |
| 4,213,189 | 7/1980 | Mueller et al. | 395/155 |
| 4,288,809 | 9/1981 | Yabe | 358/12 |
| 4,338,599 | 7/1982 | Leininger | 340/721 |
| 4,394,650 | 7/1983 | Long et al. | 340/728 |
| 4,398,190 | 8/1983 | Long et al. | 340/728 |
| 4,404,552 | 9/1983 | Hirahata et al. | 340/721 |
| 4,441,105 | 4/1984 | Van Vliet et al. | 340/750 |
| 4,591,845 | 5/1986 | Komatsu et al. | 340/745 |
| 4,616,336 | 10/1986 | Robertson et al. | 364/419 |
| 4,622,546 | 11/1986 | Sfarti et al. | 340/748 |
| 4,639,721 | 1/1987 | Eto et al. | 340/747 |
| 4,644,401 | 2/1987 | Gaskins | 358/183 |
| 4,660,156 | 4/1987 | Guttag et al. | 340/799 |
| 4,686,521 | 9/1987 | Beaven et al. | 340/703 |
| 4,724,431 | 2/1988 | Holtey et al. | 340/703 |
| 4,734,707 | 3/1988 | Sasaki | 364/520 |
| 4,757,309 | 7/1988 | Bowater et al. | 340/703 |
| 4,814,756 | 3/1989 | Chauvel | 340/750 |
| 4,827,249 | 5/1989 | Chauvel et al. | 340/703 |
| 4,862,156 | 8/1989 | Westberg et al. | 364/521 |
| 4,864,516 | 9/1989 | Gaither et al. | 364/521 |
| 4,881,180 | 11/1989 | Nishiyama | 364/521 |
| 4,894,789 | 1/1990 | Yee | 364/521 |
| 4,928,253 | 5/1990 | Yamauchi et al. | 364/521 |
| 4,941,108 | 7/1990 | Aoyagi et al. | 364/521 |

Primary Examiner—Michael R. Fleming
Assistant Examiner—Debra A. Chun
Attorney, Agent, or Firm—Limbach & Limbach

[57] ABSTRACT

In the present invention, a communication system is disclosed. The communication system comprises a remote computer 20 and a local computer 40, linked by communication link 12. The local computer 40 operates a conventional alphanumeric communication program 42 which receives alphanumeric data from the remote computer 20. The local computer 40 also comprises a supervisory program 56 which is Terminate and Stay Resident in memory, and which interrupts the operation of the alphanumeric communication program 42. When a particular command query is generated from the remote computer 20, the supervisory program 56 causes the local computer 40 to respond thereto, indicating the capabilities of the local computer 40 for graphical data display. When graphical data, which has been compressed and encoded in alphanumeric format is transmitted by the remote computer 20 and is received by the local computer 40, and stored in a first memory 44, the local computer 40 decodes the alphanumeric format and decompresses to regenerate the original graphical data. The original graphical data is then stored in a second memory 54 and the display unit 48 is directed to receive the graphical data and to display on the display unit 48.

18 Claims, 2 Drawing Sheets

Microfiche Appendix Included
(72 Microfiche, 2 Pages)

METHOD AND AN APPARATUS FOR DISPLAYING GRAPHICAL DATA RECEIVED FROM A REMOTE COMPUTER BY A LOCAL COMPUTER

This application is submitted with a microfiche appendix, having Exhibits A and B and containing copyrighted material, Copyright 1990, Teknekron Communications Systems, Inc. The appendix consists of Exhibit A: one microfiche, with 10 frames; and Exhibit B, one microfiche, with 62 frames.

The copyright owner has no objection to the facsimile reproduction by anyone of the patent document or the patent disclosure, as it appears in the Patent and Trademark Office patent files or records, but otherwise reserves all copyright rights whatsoever in the appendices.

TECHNICAL FIELD

The present invention relates to a method and an apparatus for displaying graphical data which is received from a remote computer, by a local computer, and, more particularly, wherein the local computer is operating a conventional alphanumeric communications program for communicating with the remote computer.

BACKGROUND OF THE INVENTION

Communication programs for personal computers are well-known in the art. Heretofore, communication programs permit the personal computer, acting as a local computer, to communicate with a remote computer. However, when the personal computer is operating with the communication program, to the remote computer, the personal computer is like a "dumb terminal" in that it is incapable of responding to command queries from the remote computer. Further, conventional communication programs for the personal computer has permitted communication only through the transmission and reception of alphanumeric data. Conventional communication programs are unable to transmit or receive graphical data.

U.S. Pat. No. 3,967,268 discloses a data display system, wherein a bit value preceding data determines whether the data that follows is alphanumeric or graphical. Based upon this preceding bit value, the display unit then displays the data as either alphanumeric or graphical.

U.S. Pat. No. 3,624,632 shows a mixed alphanumeric-graphic display that uses a control command to determine whether alphanumerical or graphical data is to be displayed. See also U.S. Pat. No. 4,338,599.

SUMMARY OF THE INVENTION

In the present invention, wherein a local computer is linked to communicate with a remote computer, and wherein the local computer has an alphanumeric communication program for communicating with the remote computer by transmitting data in alphanumeric format to and receiving data in alphanumeric format from the remote computer, the improvement comprises a supervisory program in the local computer. The supervisory program has means for periodically and on detection of external events, interrupting the alphanumeric communication program. The supervisory program further comprises means for comparing the data received from the remote computer to a stored data. Finally, the supervisory program comprises means for causing the transmission of a response data by the alphanumeric communication program back to the remote computer in response to the comparison.

In another feature of the present invention, the supervisory program receives data in alphanumeric format from the alphanumeric communication program and translates that data into graphical data. The graphical data is stored in a second means. The supervisory program directs the display means to displaying the graphical data from the second memory means.

DETAILED DESCRIPTION OF THE DRAWINGS

Figure 1:
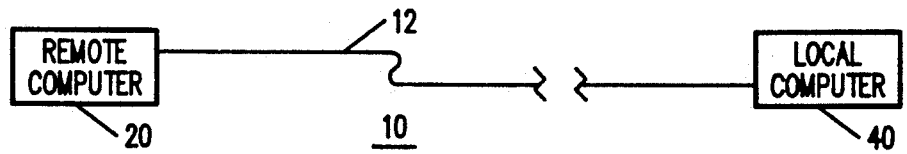
FIG. 1 is a schematic drawing of a local computer operating with the improved program of the present invention, communicating with a remote computer.

Referring to FIG. 1, there is shown a system 10 of the present invention. The system 10 comprises a remote computer 20, linked by a communication link 12 to a local computer 40.

Figure 2:
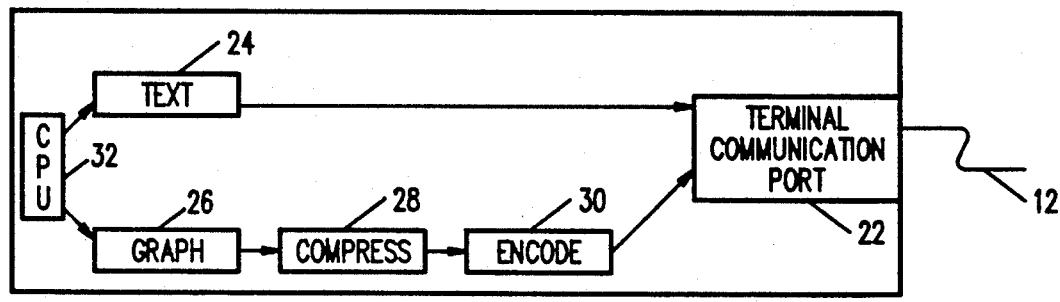
FIG. 2 is a detailed schematic diagram of the portion of the remote computer, wherein alphanumeric data and graphical data are supplied to the communication port of the remote computer for communication with the local computer.
Figure 3:
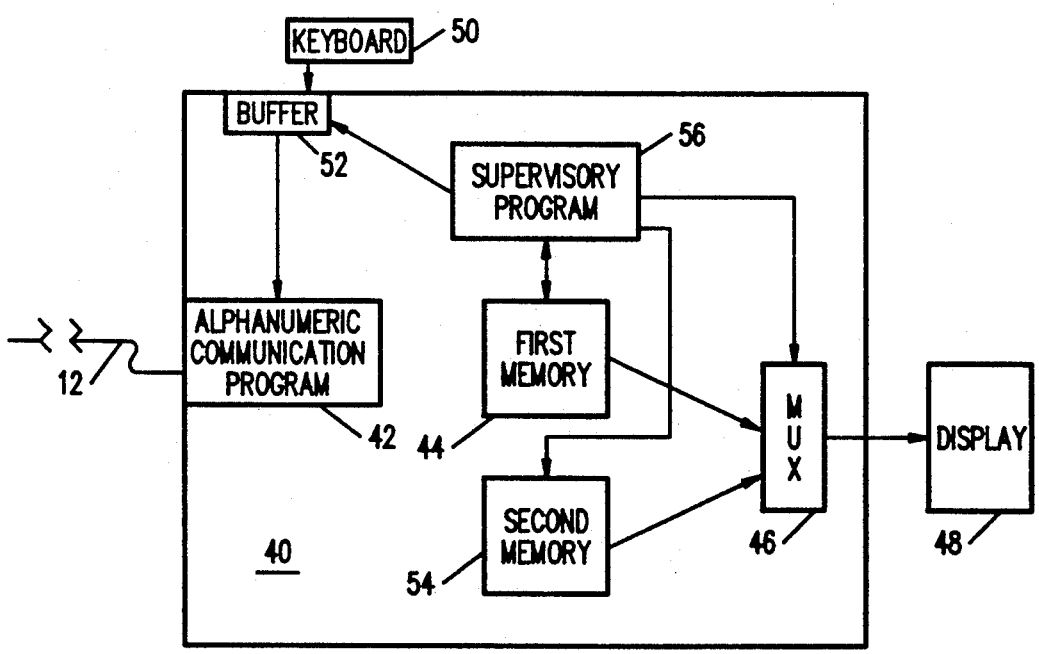
FIG. 3 is a schematic block diagram of the local computer operating with the improved program of the present invention in one embodiment.

Schematically, the major block diagram components of the remote computer 20 are shown in FIG. 2. The communication link 12 is connected to the terminal communication port 22 of the remote computer 20. The remote computer 20 also comprises a processor 32. The processor 32 directs either text data 24 to be supplied to the terminal communication port 22 and to be placed on the communication link 12, or graphical data 26 to be supplied to the terminal communication port 22 to be supplied to the communication link 12. The graphical data 26, before being supplied to the terminal communication port 22, however, is first compressed by a compressor 28 to form a compressed graphical data. The compressed graphical data is then encoded by an encoder 30. The function of the encoder 30 is to translate compressed graphical data into bit stream that corresponds to alphanumeric data format. The encoded, compressed graphical data is then supplied to the terminal communication port 22. In one embodiment, the remote computer 20 is an IBM main frame of the type model 3090, executing CICS/MVS operating system. A copy of the program to compress and to encode graphical data is shown on the attached Exhibit A.

The local computer 40 operates a conventional alphanumeric communication program 42, such as Smart Com (trademark of Hayes Microcomputer, Inc.) or Xtalk (trademark of Digital Communications, Inc.). In one embodiment, the local computer 40 can be an IBM XT/AT or compatible. The alphanumeric communication program 42 is capable of receiving data in alphanumeric format from the communication link 12 from the remote computer 20 and is capable of storing the received data in a first memory 44. From the first memory 44, the data is then supplied through a multiplexer 46 for display by a display unit 48. The local computer 40 also comprises a conventional keyboard 50 which supplies alphanumeric data to a buffer 52 of the local computer 40. Finally, the local computer 40 comprises a second memory 54 and a supervisory program 56.

Figure 4:
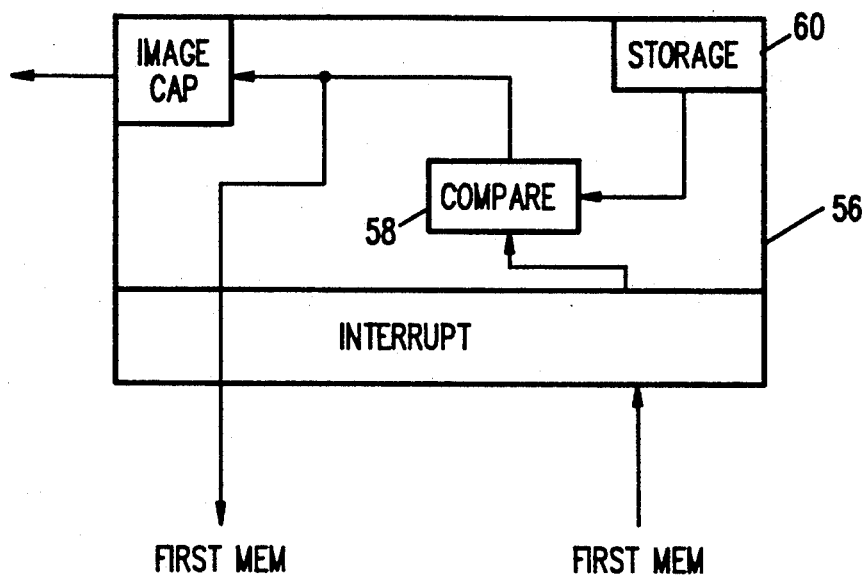
FIG. 4 is a more detailed schematic diagram of the supervisory program of the present invention for use in the local computer.
Figure 5:
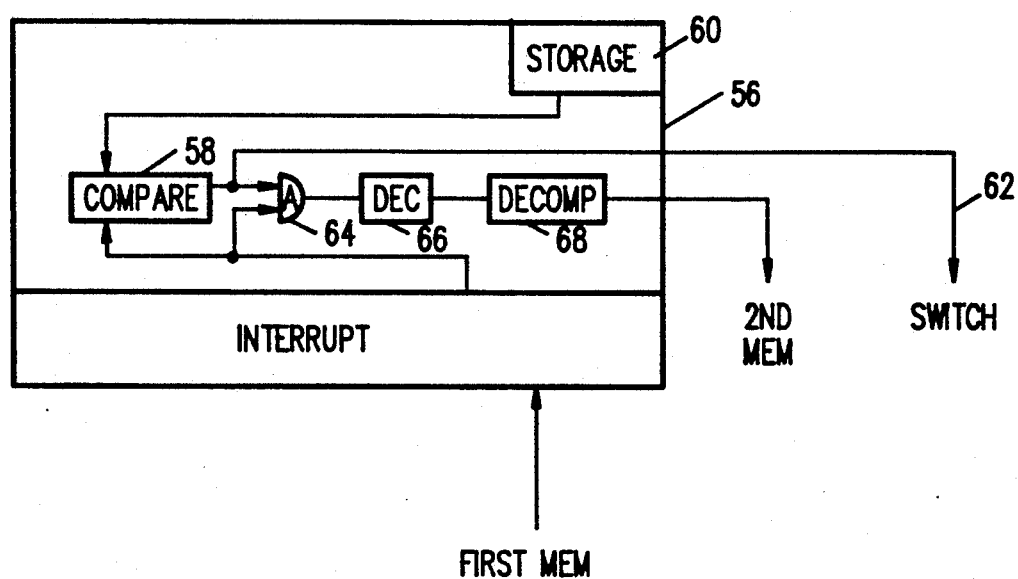
FIG. 5 is a more detailed schematic block diagram of another embodiment of the supervisory program of the present invention.

Referring to FIG. 4, there is shown in schematic block diagram one function of the supervisory program 56. In one preferred embodiment, the supervisory program 56 is a Terminate-and-Stay-Resident (TSR) type of program. This means that the supervisory program 56 is resident in memory at all times. A copy of the preferred embodiment of the supervisory program 56 is attached herewith as Exhibit B.

The function of the supervisory program 56 is to periodically interrupt the processing of the alphanumeric communication program 42 and to periodically review the contents of the first memory 44. In one preferred embodiment, the interruption occurs every 55 milliseconds. The data from the first memory 44 is retrieved from the first memory 44 and is compared by a comparator 58 to data that is previously stored in storage 60. If the result of the comparison shows that the data from the first memory 44 is the same as the data from the storage 60, then the comparator 58 causes a string of predetermined alphanumeric data to be supplied to the buffer 52 for transmission by the alphanumeric communication program 42 through the communication link 12 back to the remote computer 20.

In the preferred embodiment, the supervisory program 56 interrupts the operation of the alphanumeric communication program 42 and looks for the particular alphanumeric data string of "$$CAP". When this string of alphanumeric data is detected by the supervisory program 56, the supervisory program 56 causes the string "$$CAP" to be erased from the first memory 44; i.e., that string of alphanumeric data is not displayed on the display 48. Further, the supervisory program 56 causes the alphanumeric data of "G" to be sent to the buffer 52 for transmission by the alphanumeric communication program 42 to the remote computer 20.

The supervisory program 56 also has the capability of receiving the data from the first memory 44 and comparing it to another string of predetermined alphanumeric data which is stored in the storage 60. When the software comparator 58 finds that the data from the first memory 44 matches the second string of alphanumeric data from the storage 60, the comparator 58 issues a switch signal 62. The switch signal 62 is supplied to a software logical AND gate 64 to which data thereafter from the first memory 44 is also supplied. The data from the first memory 44 is passed through the AND gate 64 and is decoded by a decoder 66. The decoder 66 serves to decode the data to produce a compressed graphical data. The decoder 66 operates in the opposite way as the encoder 30 operates. The compressed graphical data from the decoder data 66 is then supplied to a decompressor 68 which decompresses the graphical data. The decompressor 68 serves to operate on the data in the opposite manner as the compressor 28 of the remote computer 20. The decoded, decompressed graphical data is then supplied to the second memory 54 and stored therein. The switch signal 62 also causes the multiplexer 46 to be switched from the first memory 44 to the second memory 54. The graphical data from the second memory 54 is then supplied through the multiplexer 46 to the display 48 and is displayed as graphical data thereon.

To switch the local computer 40 back to the mode of displaying alphanumeric data, two embodiments are possible. First, the remote computer 20 can send another string of data which would cause the supervisory program 56, upon the detection thereof, to cause the local computer 40 to revert back to the display of alphanumeric data. In the preferred embodiment, however, the user can enter a command through the keyboard, which would be detected by the supervisory program 56, causing the local computer 40 to revert back to the display of alphanumeric data.

The operation of the system 10 of the present invention will be described as follows: Initially, when the remote computer 20 detects that a communication request is received along the communication link 12, the remote computer 20 supplies alphanumeric data 24 to the terminal communication port 22 to the local computer 40. Since initially the communication device connected to the communication link 12 can be a "dumb terminal", or a local computer 40 operating with a conventional alphanumeric communication program, emulating a dumb terminal, or a local computer 40 with the improvement of the present invention, the remote computer 20 will not be able to distinguish the type of communication device which is attached to its communication port 22. Thus, initially, the remote computer 20 operates at the lowest denominator; i.e., it assumes that only a "dumb terminal" is attached to the communication link 12.

However, thereafter, the remote computer 20 sends a string of alphanumeric text data of "$$CAP" along the communication link 12 to the local computer 40. The alphanumeric text string data of "$$CAP" is a command to query the capability of the local computer 40. When the text "$$CAP" is received by the alphanumeric communication program 42 and is stored in the first memory 44, the supervisory program 56 checks the contents of the first memory 44 periodically. As previously described, in the preferred embodiment, this occurs once in every 55 milliseconds. If the text string of "$$CAP" is detected; i.e., the comparator 58 finds a match between the contents of the first memory 44 and the text "$$CAP" stored in the storage 60, the supervisory program 56 causes blanks to be stored in the first memory 44 in place of the text "$$CAP". Thus, the query "$$CAP" will not be displayed under display 48. In addition, the supervisory program 56 causes the string text that follows "$$CAP" sent from the remote computer 20 to be stored in the keyboard buffer 52 which is then supplied to the alphanumeric communication program 42 back to the remote computer 20. In short, the local computer 40 would echo back the string text data received from the remote computer 20. The response by the supervisory program 56 indicates to the remote computer 20 that either the local computer 40 is (evidenced by the echo back) or is not (evidenced by the lack of an echo) capable of display of graphical data.

If the local computer 40 has responded that it is capable of display of graphical data, then the remote computer 20 operates in the following manner to supply graphical data to the local computer 40. Alphanumeric string data continues to be supplied by the remote computer 20 through the terminal communication port 22 to the local computer 40. Immediately prior to the graphical data being supplied, a string of "$$IMAGE" is supplied from the text generator 24 to the terminal communication port 22 to the local computer 40. Immediately following the string "$$IMAGE", the graphical data 26 is generated and is compressed by the compressor 28 and is encoded in alphanumeric format by the encoder 30 and is then supplied to the terminal communication port 22.

The alphanumeric communication program 42 receives the text "$$IMAGE" and stores it in the first memory 44. When the supervisory program 56 checks the contents of the first memory 44 and if the string text of "$$IMAGE" is detected, the comparator 58 generates the switch signal 62. Since the compressed graphical data is encoded as alphanumeric text format, the alphanumeric communication program 42 continues to receive that encoded, compressed graphical data and supplies it to the first memory 44. The supervisory program 56 continues to retrieve that encoded, compressed graphical data from the first memory 44 and decodes the data and decompresses the data to form the original graphical data and supplies it to the second memory 54 for storage therein. Since the switch signal 62 has been activated, switching the multiplexer 46, the display unit 48 is directed to receive the graphical data from the second memory 54 for display thereon.

Although the various components of the supervisory program 56 are discussed in the specification and shown on the drawings as hardware elements, as previously discussed, the preferred embodiment for the supervisory program 56 is that of a software program, whose listing is attached herewith as Exhibit B. The reference to hardware components was only for the purpose of facilitating an explanation of the operation of the supervisory program 56.

As can be seen from the foregoing, the system of the present invention is fully compatible with the transmission and reception of alphanumeric text data from a remote computer to a "dumb terminal". In short, the method and apparatus of the present invention is "backwards compatible" in that compatibility with existing protocol is maintained. In this manner, the method and apparatus of the present invention builds upon the existing technology and does not obsolete the user's investment in the hardware.

What is claimed is:

1. In an improvement to a local computer linked to communicate with a remote computer, said local computer having means for communicating with said remote computer by transmitting data in alphanumeric format to and receiving data ("received data") in alphanumeric format from said remote computer, wherein said remote computer generating an inquiry to said local computer encoded in said received data, the improvement to said local computer comprising:
    means for periodically interrupting said communicating means from communicating with said remote computer to cease receiving any further received data;
    means for comparing said received data from said remote computer received by said communicating means in said local computer prior to being interrupted to a stored data said stored data representing said inquiry; and
    means for causing said communicating means to transmit a response data in said alphanumeric format to said remote computer in response to said comparison to respond to said inquiry.

2. The computer of claim 1, wherein said response data transmitted by said communicating means to said remote computer, in response to said comparison, indicates to said remote computer that said local computer can receive graphical data encoded in alphanumeric data format.

3. The computer of claim 2 further comprising:
    a first memory means for storing alphanumeric data format received from said remote computer, via said communicating means; and
    display means for displaying alphanumeric data in said alphanumeric data format from said first memory means.

4. The computer of claim 3 further comprising:
    a second memory means;
    means for translating said received data in alphanumeric format into graphical data in response to said comparison;
    means for storing said translated graphical data in said second memory means; and
    means for directing said display means for displaying said graphical data from said second memory means.

5. The computer of claim 4, wherein said translating means further comprising:
    decoding means for converting said received data in alphanumeric format into a compressed graphical data; and
    decompression means for converting said compressed graphical data into said graphical data.

6. In an improvement to a local computer having a first memory means for storing alphanumeric data and display means for displaying said alphanumeric data, said local computer linked to communicate with a remote computer, and having means for communicating with said remote computer by transmitting alphanumeric data to and receiving alphanumeric data ("received alphanumeric data") from said remote computer and storing said received alphanumeric data in said first memory means, wherein the improvement to said local computer comprising:
    a second memory means;
    means for periodically interrupting said communicating means to access said received alphanumeric data;
    means for comparing the received alphanumeric data from said remote computer to a stored alphanumeric data;
    means for translating said received alphanumeric data into graphical data in response to said comparison;
    means for storing said graphical data in said second memory means; and
    means for directing said display means for displaying said graphical data from said second memory means.

7. The computer of claim 6, wherein said translating means further comprising:
    decoding means for converting said received alphanumeric data into a compressed graphical data; and
    decompression means for converting said compressed graphical data into said graphical data.

8. A system for transmitting and receiving graphical data from a remote computer to a local computer comprising:
    means for translating said graphical data into alphanumeric data format in said remote computer;
    means in said local computer, for communicating with said remote computer by transmitting data in alphanumeric format to and receiving data in alphanumeric format ("received alphanumeric data") from said remote computer;

a first memory means, in said local computer, for storing said received alphanumeric data from said remote computer via said communicating means;

display means for displaying said received alphanumeric data from said first memory means;

a second memory means, in said local computer;

means for periodically interrupting said communicating means to access said received alphanumeric data, in said local computer;

means for comparing said received alphanumeric data from said remote computer to a stored alphanumeric data, in said local computer;

means for translating said received alphanumeric data into graphical data, in said local computer;

means for storing said graphical data in said second memory means, in said local computer; and means for directing said display means for displaying said graphical data from said second memory means, in said local computer.

9. The computer of claim 8, wherein said translating means of said local computer further comprising:

decoding means for converting said received data into a compressed graphical data; and decompression means for converting said compressed graphical data into said graphical data.

10. The system of claim 9 wherein said translating means of said remove computer further comprising:

compression means for converting said graphical data into a compressed graphical data; and encoding means for converting said compressed graphical data into alphanumeric data format.

11. A method of displaying graphical data on a local computer received from a remote computer, wherein said local computer having an alphanumeric communication program for communicating with said remote computer by transmitting data in an alphanumeric format to and receiving data in said alphanumeric format ("received data") from said remote computer, a first memory means for storing said received data, and a display means for displaying said received data from said first memory means, said method comprising:

transmitting a query signal in alphanumeric data format from said remote computer to said local computer;

periodically interrupting said alphanumeric communication program by comparing said received data to a stored data;

causing said local computer to transmit an image capable signal, in said alphanumeric data format, in response to a true comparison;

encoding graphical data in said alphanumeric data format into an encoded graphical data by said remote computer;

transmitting said encoded graphical data from said remote computer to said local computer;

receiving said encoded graphical data by said alphanumeric communication program;

decoding said encoded graphical data; and displaying said graphical data.

12. The method of claim 11 further comprising the steps of storing said received encoded graphical data in said first memory means;

storing said decoded graphical data in a second memory means; and displaying said decoded graphical data from said second memory means.

13. The method of claim 11 further comprises the step of compressing said graphical data prior to encoding said graphical data.

14. The method of claim 13 further comprising the step of decompressing said encoded graphical data after decoding said encoded graphical data.

15. An apparatus for displaying graphical data on a local computer received from a remote computer, wherein said local computer having an alphanumeric communication program for communicating with said remote computer by transmitting data in an alphanumeric format to and receiving data in said alphanumeric format ("received data") from said remote computer, a first memory means for storing said received data, and a display means for displaying said received data from said first memory means, said apparatus comprising:

means for transmitting a query signal in alphanumeric data format from said remote computer to said local computer;

means for periodically interrupting said alphanumeric communication program by comparing said received data to a stored data;

means for causing said local computer to transmit an image capable signal, in said alphanumeric data format, in response to a true comparison;

means for encoding graphical data in said alphanumeric data format into an encoded graphical data by said remote computer;

means for transmitting said encoded graphical data from said remote computer to said local computer;

means for receiving said encoded graphical data by said alphanumeric communication program;

means for decoding said encoded graphical data; and means for displaying said graphical data.

16. The apparatus of claim 15 further comprising:

means for compressing said graphical data.

17. The apparatus of claim 16 further comprising:

means for decompressing said encoded graphical data.

18. The apparatus of claim 15 further comprising:

means for storing said received encoded graphical data in said first memory means;

means for storing said decoded graphical data in a second memory means; and means for displaying said decoded graphical data from said second memory means.

* * * * *